US008446283B2

(12) United States Patent
Pietrorazio

(10) Patent No.: US 8,446,283 B2
(45) Date of Patent: May 21, 2013

(54) DEVICE FOR MONITORING A BEVERAGE CONSUMPTION LEVEL

(76) Inventor: Vincent J Pietrorazio, Middlebury, CT (US)

( * ) Notice: Subject to any disclaimer, the term of this patent is extended or adjusted under 35 U.S.C. 154(b) by 0 days.

(21) Appl. No.: 11/155,358

(22) Filed: Jun. 17, 2005

(65) Prior Publication Data

US 2006/0000277 A1     Jan. 5, 2006

Related U.S. Application Data

(60) Provisional application No. 60/580,325, filed on Jun. 17, 2004.

(51) Int. Cl.
*G08B 21/00*     (2006.01)

(52) U.S. Cl.
USPC ..................... 340/612; 340/691.3; 340/580

(58) Field of Classification Search
USPC .............. 340/612, 618, 627, 641, 689, 691.3, 340/580, 582, 621; 116/218, 217; 362/101, 362/253
See application file for complete search history.

(56) References Cited

U.S. PATENT DOCUMENTS

| | | | |
|---|---|---|---|
| 4,369,442 A * | 1/1983 | Werth et al. ....................... 377/7 |
| 4,486,625 A * | 12/1984 | Reinauer et al. ......... 379/106.01 |
| 5,086,785 A * | 2/1992 | Gentile et al. ................ 600/595 |
| 5,391,328 A * | 2/1995 | Ott et al. ....................... 261/36.1 |
| 5,569,357 A * | 10/1996 | Kuhn et al. ................... 159/16.1 |
| 5,588,558 A * | 12/1996 | Cox et al. ......................... 222/64 |
| 5,644,298 A * | 7/1997 | Brooks et al. ................. 340/612 |
| 5,802,728 A * | 9/1998 | Karnick et al. ............ 33/366.18 |
| 5,812,060 A * | 9/1998 | DeSpain et al. .............. 340/618 |
| 6,053,041 A * | 4/2000 | Sinha .......................... 73/290 V |
| 6,138,508 A * | 10/2000 | Hannan et al. ............. 73/304 C |
| 6,163,248 A * | 12/2000 | Paek et al. ..................... 340/321 |
| 6,504,481 B2 * | 1/2003 | Teller .......................... 340/572.1 |
| 6,662,429 B1 * | 12/2003 | Domorazek .................... 29/593 |
| 6,751,525 B1 * | 6/2004 | Crisp, III ....................... 700/241 |
| 6,793,362 B2 * | 9/2004 | Tai ................................ 362/101 |
| 6,910,498 B2 * | 6/2005 | Cazden ......................... 137/392 |
| 2002/0184945 A1 * | 12/2002 | Chase et al. ................ 73/290 V |
| 2003/0034895 A1 * | 2/2003 | Reich ............................ 340/618 |
| 2004/0202751 A1 | 10/2004 | McKay et al. ................ 426/112 |
| 2005/0024858 A1 | 2/2005 | Johnson ........................ 362/154 |
| 2005/0028550 A1 * | 2/2005 | Crettet, IV ..................... 62/391 |
| 2005/0120793 A1 * | 6/2005 | Cochran et al. ................. 73/313 |

* cited by examiner

*Primary Examiner* — Daniel Previl
(74) *Attorney, Agent, or Firm* — Paul D. Greeley, Esq.

(57) ABSTRACT

A device which detects or senses liquid level in a beverage containment vessel, and produces either light, audio or a data output based on the liquid level being equal to or less than a predetermined level. The device, in practice, preferably retains the shape of the beverage containment vessel (e.g., cylindrical), and have an outer housing of opaque or semi-translucent material. The device is either integrated into a new beverage containment vessel, or retrofitted to existing vessels. The device is powered by battery, and can be switched on, off, or into various operating modes by internal switching mechanism.

14 Claims, 7 Drawing Sheets

| BCLM DEVICE MODES OF OPERATION | | |
|---|---|---|
| NUMBER OF SWIPES | COUNTER OUTPUT | MODE OF OPERATION |
| 0 | 000 | OFF |
| 1 | 001 | LEVEL MONITOR |
| 2 | 010 | LEVEL MONITOR |
| 3 | 011 | OFF |
| 4 | 100 | YELLOW |
| 5 | 101 | GREEN |
| 6 | 110 | RED |
| 7 | 111 | GREEN/RED ALT. |

DEVICE FOR MONITORING A BEVERAGE CONSUMPTION LEVEL

CROSS REFERENCE TO RELATED PATENT APPLICATIONS

This application claims priority to U.S. Provisional Patent Application Ser. No. 60/580,325, filed on Jun. 17, 2004 which is herein incorporated by reference in its entirety.

FIELD OF THE INVENTION

The present invention relates to a sensing device for use in liquid level determination and to output processed information regarding this level in the form of light or data.

BACKGROUND OF THE INVENTION

In a restaurant, tavern, nightclub, or other public setting, the service staff has the task of determining if patrons require subsequent beverage(s) after their original service. In many instances, patrons have a problem getting a server's attention, or a server may not be as attentive as he/she should be in providing follow-up service. This problem is often attributable to poor or incomplete communication between the patron and the service staff. Resulting effects of this poor or incomplete communication include reduced revenue for the service establishment, a determination by the patron of poor service by the service staff, little or no gratuity for services rendered, decisions to leave an establishment prior to when one might leave if services were rendered more quickly, and ultimately, a decision not to return to an establishment due to the expectation that poor services will be rendered in the future.

Up until the present time, communication between service staff and patrons has been either by verbal, suggestive motioning or sign language, or by visual inspection of empty or nearly empty glass and/or plastic ware by the service staff.

A secondary communication method would be most helpful in providing information to service staff without direct communication interface between the server and patron.

Also, management of service staff by establishment managers and/or owners have a three tiered problem in determining:

(a) the proper number of service staff employees required for a static or dynamic patron load;
(b) the efficiency of overall service team performance, and;
(c) the individual performance of service staff employees in specific service tasks or sections.

Any of these above three components, or any combination of the above components, could be responsible for the resulting effects of poor or incomplete communications between the patrons and service staff cited above.

Up until the present time, managers have relied on observation, interview techniques, historical data, individual customer feedback, and overall establishment performance in managing service staff employees.

To assist establishment managers in managing: (a) staff load-matching, (b) service efficiency, and (c) individual performance, a secondary communication method, which is a one-to-many point method, would be most helpful in determining the immediate load, efficiency, and individual performance of service staff employees. Also, a recording, synthesis, and analysis of communication data from a secondary communications method would be most helpful in evaluating future staffing levels, efficiency improvement and/or gaps, and individual performance improvements and/or gaps.

There does not yet exist a device that is either integral to or attached to a beverage consumption vessel which addresses the solution to the above cited problem.

Therefore, there is a need for a device for attachment to or integration into a cup that signals a user.

There is also a need for a device that can be easily used and does not effect the taste or sanitary conditions of the beverage in the cup.

There is also a need for a device that can be conveniently connected to a beverage cup or glass.

SUMMARY OF THE INVENTION

The device of the present disclosure assists in the alleviation of the patron-server communication problem and the betterment in managing service staff. The device of the present disclosure has the following objects and advantages:

(a) The device of the present disclosure will give visual indication via light output or other data from the device proportional to the liquid level in the attached vessel.
(b) The device of the present disclosure is activated and deactivated by means of an internal magnetic switch, which is intended for use by establishment service staff.
(c) The device of the present disclosure will contain an internal DC power source, which will allow nominal operation of the device for approximately 6 months.
(d) The device of the present disclosure can withstand ambient temperature from $-10°$ F. to $+200°$ F., allowing it to be dishwasher safe.
(e) The device of the present disclosure can have several modes of operation:
   Level monitoring mode, which will have several visual indications proportional to discrete liquid levels in the attached vessel
   Illumination mode, in which the device can produce a solid or flashing light output in various colors
   Inactive mode, in which the device is off.
(f) The device of the present disclosure is programmed to reset after approximately 1-hour of operation, which will extend power source life.
(g) The device of the present disclosure can be placed into the various modes of operation (programmed) by sequential operation (iteration) of the internal magnetic switch.
(h) The device of the present disclosure will feature approximately 5¼ in$^2$ of advertising space at the bottom of the device, which may be illuminated for a backlit effect.
(i) The device of the present disclosure will feature approximately 4 in$^2$ of advertising space around the perimeter of the device, which may be illuminated for a backlit effect.
(j) The device of the present disclosure will enable establishment service staff to quickly determine the liquid level in a patron's glass or other beverage containment vessel without having to look at the level or communicate with the patron directly, thus giving the opportunity for faster, more efficient service.
(k) The device of the present disclosure will enable establishment management to quickly determine the degree of service inefficiency in a particular room, section, or by service staff members.
(l) The device of the present disclosure will enable establishment management to quickly determine if an overload condition is occurring, thus aiding management's staffing resource decisions.

(m) The device of the present disclosure can modulate the behavior of patrons while consuming beverages in glass or plastic ware which is utilizing the device. The device can aid the establishment in increasing beverage sales through varying rates of consumption and efficiency gains.

In accordance with one aspect of the present invention, there is provided an angular displacement sensor for determining a level of the beverage.

An apparatus for sensing a consumption level of a liquid in a container, the apparatus comprising: a housing; a sensor being disposed in proximity to the container to detect a level of the liquid; and an alarm in communication with the sensor, wherein the alarm emits at least one signal when the sensor detects that the level of the liquid is equal or less than a predetermine level. The sensor is disposed in proximity to a bottom portion of the container. The alarm is at least one selected from the group consisting of: a light, a colored light, a colored light that is emitted through the liquid, audio, and any combinations thereof. The sensor is preferably an angular displacement sensor. The sensor determines a plurality of readings of displacement based on a plurality of different liquid levels in the container, and communicates at least one output signal to the alarm. The apparatus further includes a data input device for programming the apparatus, wherein the data input is capable of performing at least one function selected from the group consisting of: turning the apparatus on or off, setting the operational mode of the apparatus, and programming the apparatus. The data input device is at least one device selected from the group consisting of: a magnetic switch and a hall effect sensor. The data input device is a magnetic switch that generates a pulse code for programming the apparatus. The magnetic switch is a reed type switch.

A method of signaling that a beverage container requires a refill, the method comprising: detecting the level of the beverage disposed within the container; determining if the detected level is equal to or less than a predetermined level; and if the detected level is equal to or less than a predetermined level, activating an alarm. The method further comprises a step of programming the container, wherein the programming step is at least one step selected from the group consisting of: turning the container on or off, setting the operational mode of the container, and programming the container.

According to another aspect of the present invention, there is provided a device which is either integral or retrofit to glass and plastic beverage containment vessels which will determine the liquid level in the vessel by angular displacement, and output various light or data based on that level. Also, the device can be used for decorative purposes by use of different light modes.

BRIEF DESCRIPTION OF THE DRAWINGS

Other and further objects, advantages and features of the present invention will be understood by reference to the following specification in conjunction with the accompanying figures, in which like reference characters denote like elements of structure and.

DESCRIPTION OF THE PREFERRED EMBODIMENT

Figure 1:
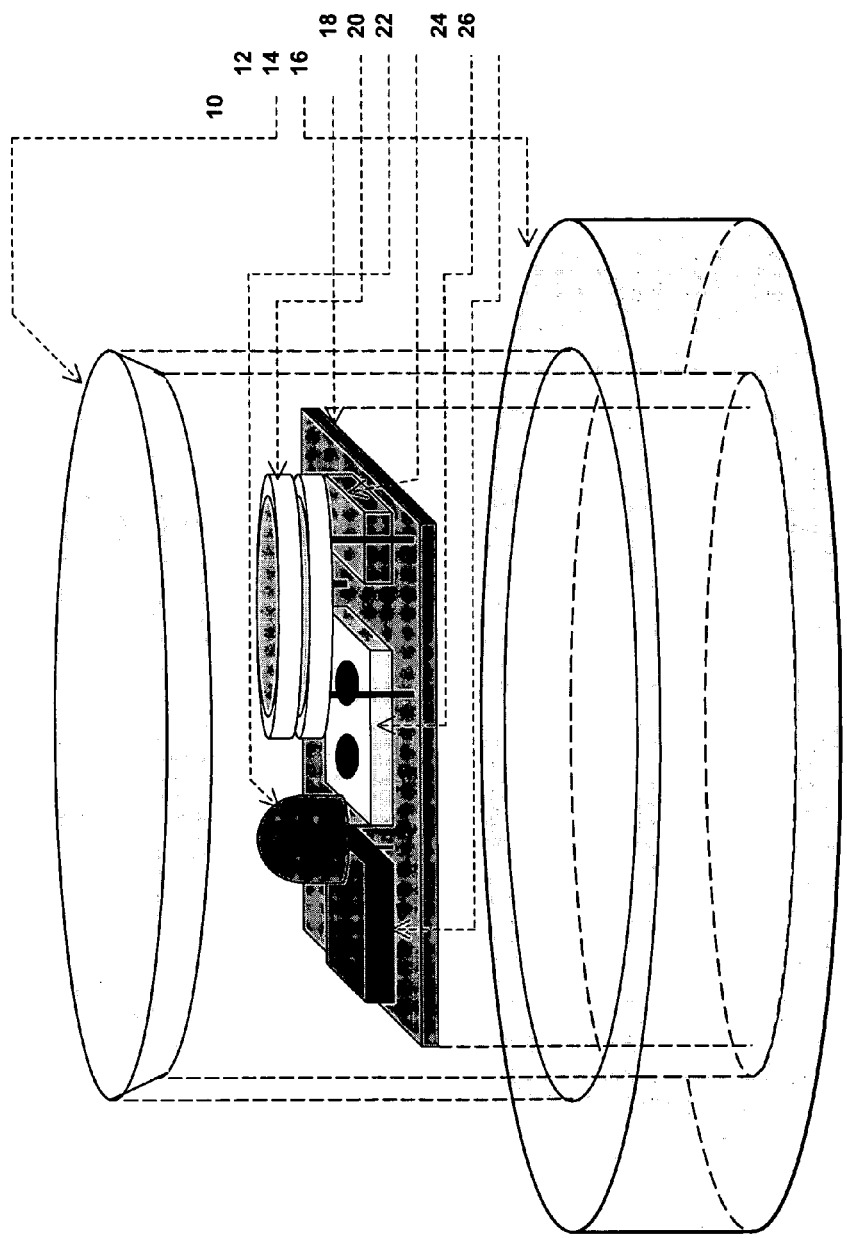
FIG. 1 shows the mechanical components of the preferred embodiment, including approximate dimensions.

Referring to FIG. 1, the device 10 in the preferred embodiment has a housing consisting of a cap 12 and a cup 14. The cap 12 has the approximate shape and dimensions as shown in FIG. 1 (or other shape or dimensions to correspond to the opening in a cup) and may have any other suitable dimensions complementary to any beverage container known in the art.

The device 10 also has a plastic cup 14. The cup 14 has approximately a cylindrical shape (or any other shape to conform to the dimensions of applicable glass and/or plastic ware), and of the approximate dimensions (or other dimensions to conform to the dimensions of applicable glass and/or plastic ware) shown in FIG. 1.

The cap 12 and cup 14 preferably are made of plastic material, and will be opaque or semi-translucent. Reflective material, such as foil or coatings, may be placed into the cup 14 as necessary for desired light output characteristics.

Figure 5:
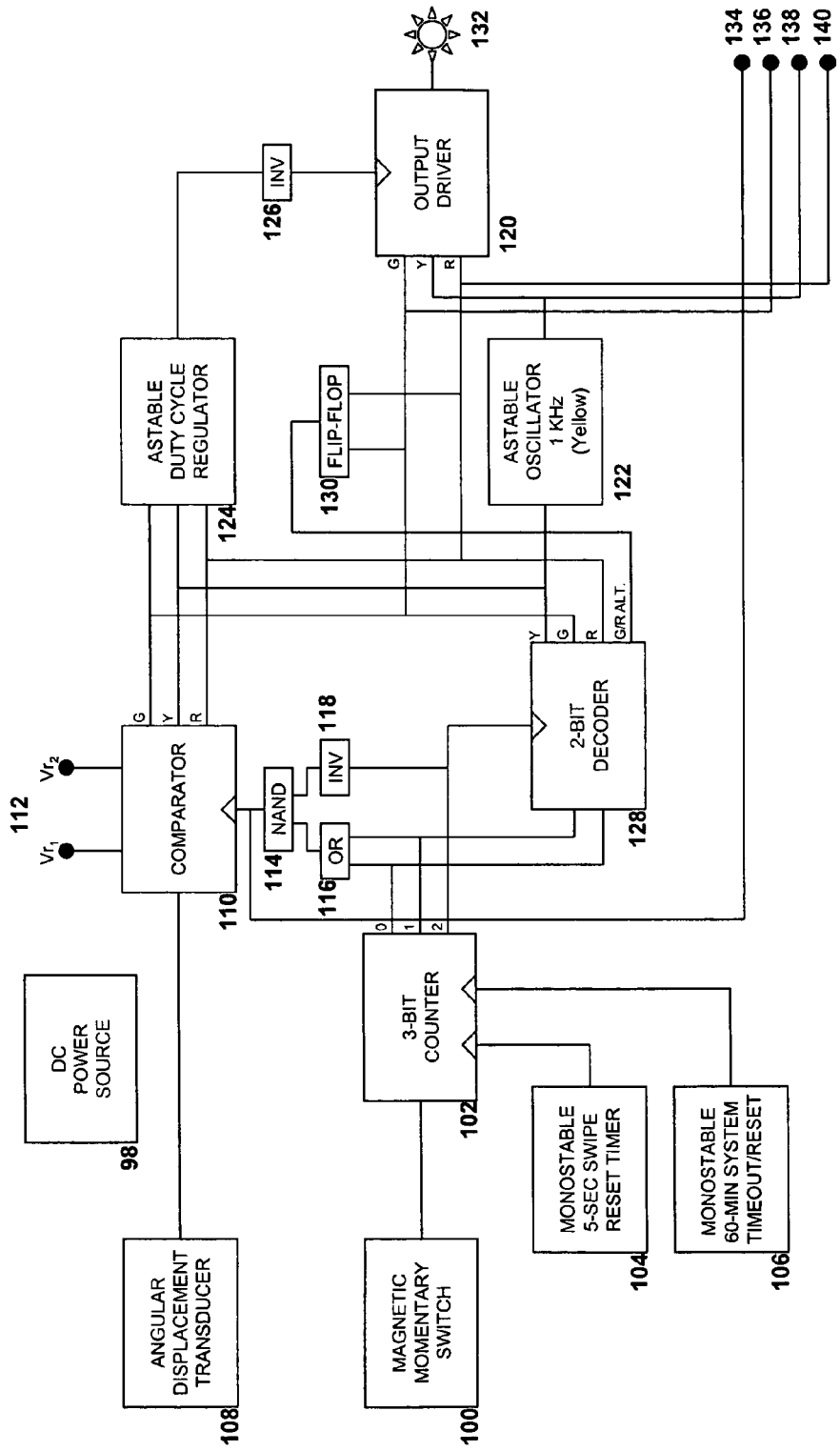
FIG. 5 shows the detailed block diagram of the electronic circuit within the BCLM device.

Inserted into the housing 12 and 14 of the device 10 is:
a small circuit board 16, which has several subcomponents:
a DC power source 18 having one or more batteries;
a magnetic switch 24;
an angular displacement transducer 22:
a bi-color (green/red) light-emitting device 20, which can be illuminated in either green, red, or combined green/red (yellow);
an integrated circuit "chip", 26 with all remaining electronic components (as shown in FIG. 5 to follow).

The above device housing, as described by 12 and 14 above, is included in the preferred embodiment for device 10 retrofit to existing glass and/or plastic ware. Note that if the device 10 is to be made integral to glass—and/or plastic ware during original glass and/or plastic ware manufacture, the device 10 may have the circuit board 16 or may include outer housing(s) that vary from the shape and dimensions of the housing as described in 12 and 14 above.

The device 10 may be retrofit or is permanently attached to the bottom of existing beverage containment vessels by means of permanent adhesive applied to the top of the device, as assembled, or any other affixing means known in the art. Input to the device 10 by the device operator is by means of an internal magnetic switch, which can be operated prior to insertion of beverage into the attached glass and/or plastic ware. The magnetic switch can be of reed type, single-pole single throw normally open contacts, or equivalent. The magnetic switch allows input to the device by the user, without the need for an external switching device.

Figure 2:
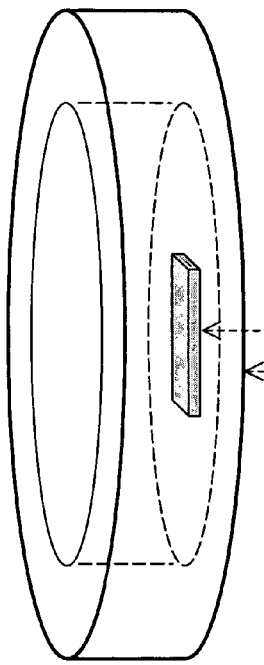
FIG. 2 shows the operation and functionality of the internal magnet switch and the modes of operation of the Beverage Consumption Level Monitor (BCLM) device.
Figure 2:
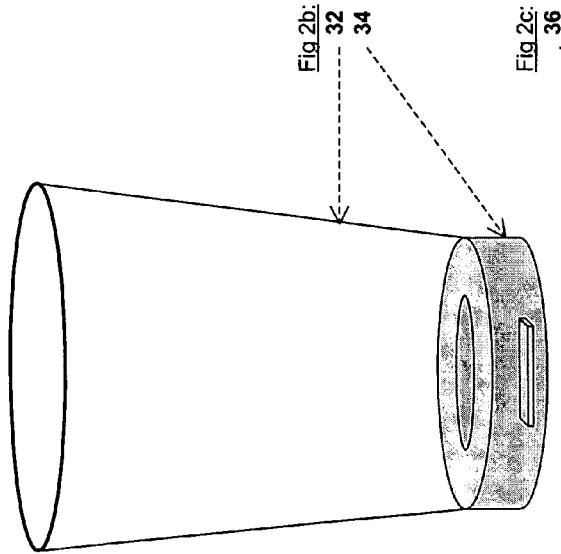
Figure 2:
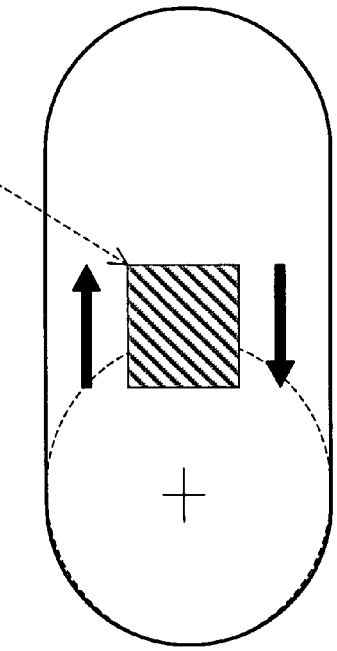

Referring to FIG. 2a, the internal magnetic switch 28 is mounted on the circuit board internal to the device within the housing 30, in a relative position suitable for operation. Referring to FIG. 2b, the beverage containment vessel 32 and attached or integrated device 34 is operated by movement (FIG. 2c) as a unit across a small plate of magnetized steel 36 or other source of magnetic field, thus closing the magnetic momentary switch contacts. The device 10 will count the number of swipes that the device operator has performed, and thus the number of contact closures of the internal magnetic switch. FIG. 2d 38 shows a chart which is described as follows. The count range in the preferred embodiment is 0 through 7 (eight possible count combinations). The number of swipes corresponds to specific device modes of operation, which include the following device modes in the preferred embodiment:

(a) level monitor mode
(b) yellow illumination mode
(c) green illumination mode
(d) red illumination mode
(e) alternating green/red illumination mode.

Figure 3:
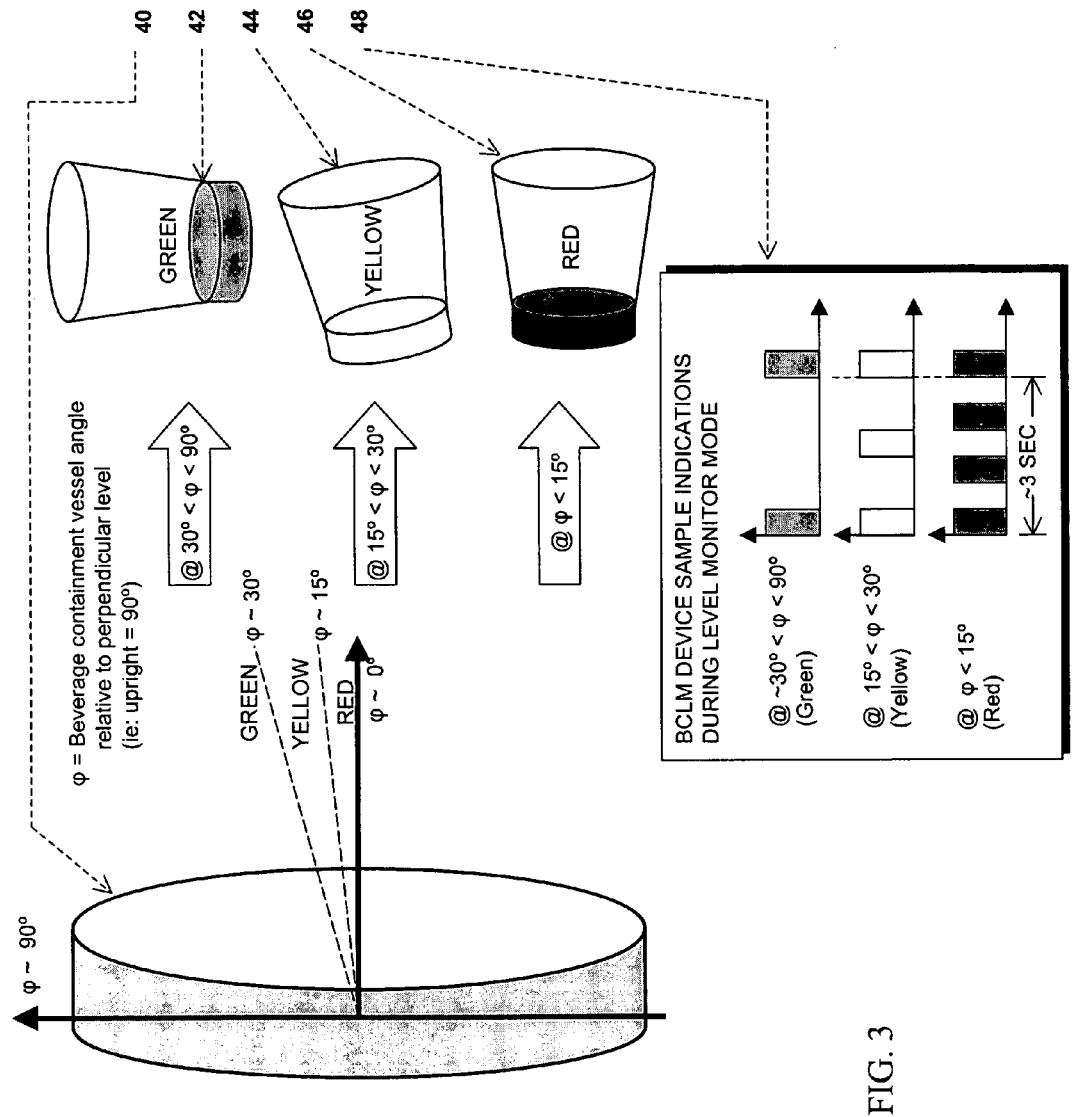
FIG. 3 shows the functionality and output characteristics of the level monitor mode.

FIG. 3 describes the functionality and output characteristics of the device during level monitor mode. The following discussion refers to the device as integral or as attached to a beverage containment vessel.

40 shows the device on an axis depicting the tilt angle of the device as if in its meant use. If the vessel and device remains between 90° (upright) and approximately 30° (0° referencing that the device and vessel is perpendicular to a level surface), the device while in level monitoring mode will be in the green state (42). If the vessel breaks through the approximate 30° angle, but remains at an angle greater than approximately 15° from perpendicular, which corresponds to a beverage consumption of approximately 50% of the volume of the vessel, the device while in level monitoring mode will switch and latch to the yellow state (44). If the vessel breaks through the approximate 15° angle, which corresponds to a beverage consumption of approximately 75% of the volume of the vessel, the device will switch and latch to the red state (46).

Angular displacement of the device and vessel is converted to a proportional electrical signal by means of a angular displacement transducer. The transducer functions by means of a highly stable silicon micro-machined capacitive inclination sensor element. It functions by utilizing an acceleration sensing element with a DC response to measure inclination relative to gravity. The response to the sensor is dependent on the magnitude of gravity parallel to the sensor element. The output of the transducer will be an offset voltage response proportional to the amount of gravity measured by the transducer. The transducer offers a cost-effective, more reliable, and environmentally safe alternative to mercury-based angular displacement sensors.

The green, yellow and red device output states are described by chart (48). In the green output state, the light-emitting device will be energized to produce green light output for approximately ½ second approximately every three seconds. This corresponds to an output duty cycle of approximately 17%. In the yellow output state, the light-emitting device will be energized by application of alternating current of approximately 1 KHz, which will cause the green and red components of the light-emitting device to illuminate concurrently, thus outputting yellow. The light-emitting device will be energized for approximately ½ second approximately every 1½ seconds, corresponding to a duty cycle of approximately 33%. In the red output state, the light-emitting device will be energized to produce red light output for approximately ½ second approximately every second, which corresponds to a duty cycle of approximately 50%. The primary function of the light-emitting device will be to illuminate and draw external attention to the device and not necessarily to illuminate the vessel.

Figure 4:
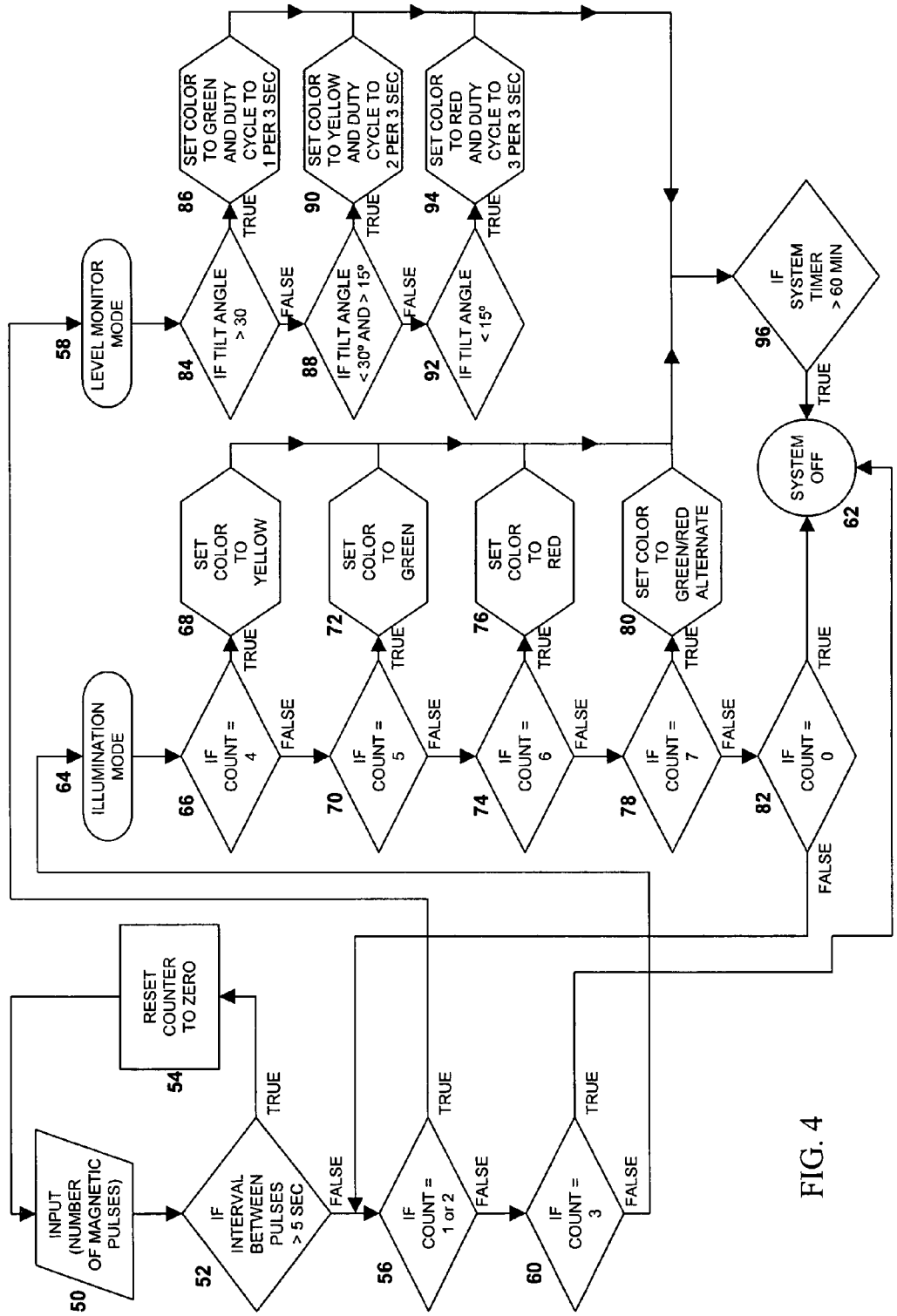
FIG. 4 shows the functional flow diagram of BCLM device operation.

FIG. 4 shows the functional flow diagram of operation of the device in its preferred embodiment. The diagram can be discussed in three sections, from left to right.

Step (50) Describes the number of input magnetic pulses to the device. Step (52) If the time interval between pulses (swipes) exceeds approximately 5 seconds, then (54) the pulse counter is reset to zero. Step (56) If the pulse counter is equal to either 1 or 2, then the device is set to (58) level monitor mode.

Step (60) if the pulse counter is equal to 3, then the device is set to (62) system off, else the device is set to illumination mode (64).

Referring to step (64) illumination mode: Step (66) If the pulse counter is equal to 4, then the device will be set to (68) yellow illumination mode, independent of device angle or liquid level. Step (70) if the pulse counter is equal to 5, then the device will be set to step (72) green illumination mode, independent of device angle or liquid level. Step (74), if the pulse counter is equal to 6, then the device will be set to (76) green illumination mode, independent of device angle or liquid level.

Step (78) If the pulse counter is equal to 7, then the device will be set to step (80) green/red alternating illumination mode, independent of device angle or liquid level. Step (82) If the pulse counter is equal to eight, the counter toggles to zero, and the device is set to (62) system off.

Referring to Step (58) level monitor mode: Step (84) If the tilt angle of the device relative to perpendicular is greater than approximately 30°, then the device output is set to (86) green output mode, and the output duty cycle is set to 1 cycle per 3 seconds. Step (88) if the tilt angle of the device relative to perpendicular is less than approximately 30° and greater than approximately 15°, then the device output is set to (90) yellow output mode, and the output duty cycle is set to 2 cycles per 3 seconds. Step (92) if the tilt angle of the device relative to perpendicular is less than approximately 15°, then the device output is set to (94) red output mode, and the output duty cycle is set to 3 cycles per 3 seconds. (96) if in any output state 60 minutes elapses from the last input pulse, the device is set to (62) system off.

FIG. 5 shows the detailed block diagram of the device in its preferred embodiment. The diagram will enable a person knowledgeable with electronics and the functionality of the device to design and build a circuit fit for the purpose of implementing this device.

Describing FIG. 5, a DC power source (98) is made available with sufficient voltage and power characteristics to supply all components in the circuit that require it. The preferred power source would be a compact cylindrical packaged cell or group of cells, utilizing either zinc-manganese-dioxide alkaline, lithium ion, nickel-cadmium silver-oxide, or other energy cell technologies. Power requirements in the preferred embodiment would be on the order of 500 mAH direct current at a supply voltage between 4.5 and 6 volts.

The magnetic momentary switch (100) sends its signal pulses when operated to a 3-bit (or octal) counter (102), which is enabled by: (104) the 5-second swipe interval timer, and (106) the 60-minute system timer. In device level monitor mode, an angular displacement transducer (108) sends its output voltage corresponding to the angle of the device to a comparator (110), which compares this signal to the reference voltages $Vr_1$ and $Vr_2$ (112). The output of the 3-bit counter, as processed by the NAND (114), OR (116), and INV (118) logic gates (which indicates the device is in level monitor mode), enables the comparator to output one of three states: green, yellow, or red. These state signals are input to the output driver (120). In the case of the yellow state, the state signal is sent to enable the 1 KHz oscillator (122) which becomes the input state signal to the out driver. The output driver is enabled by the a stable duty cycle regulator (124), which assigns the appropriate duty cycle through the INV gate (126), as defined by the earlier discussion of FIG. 3.

In device illumination mode, the output of the 3-bit counter (102) is input to a 2-bit decoder (128), which determines based on the counter status what illumination state is set, and then sends this signal to the output driver (120), similar to the level monitor mode as discussed above. In green/red illumination state, the output of the decoder is sent to a flip-flop (130), which toggles the signal input to the out driver between green and red at a predetermined rate. Duty cycle is pre-set in illumination mode, and not a function of device angle or output state.

The output driver (120) delivers current to the light-emitting device (132).

Device signals (134, 136, 138, 140) will be referenced below in FIG. 6.

Figure 6:
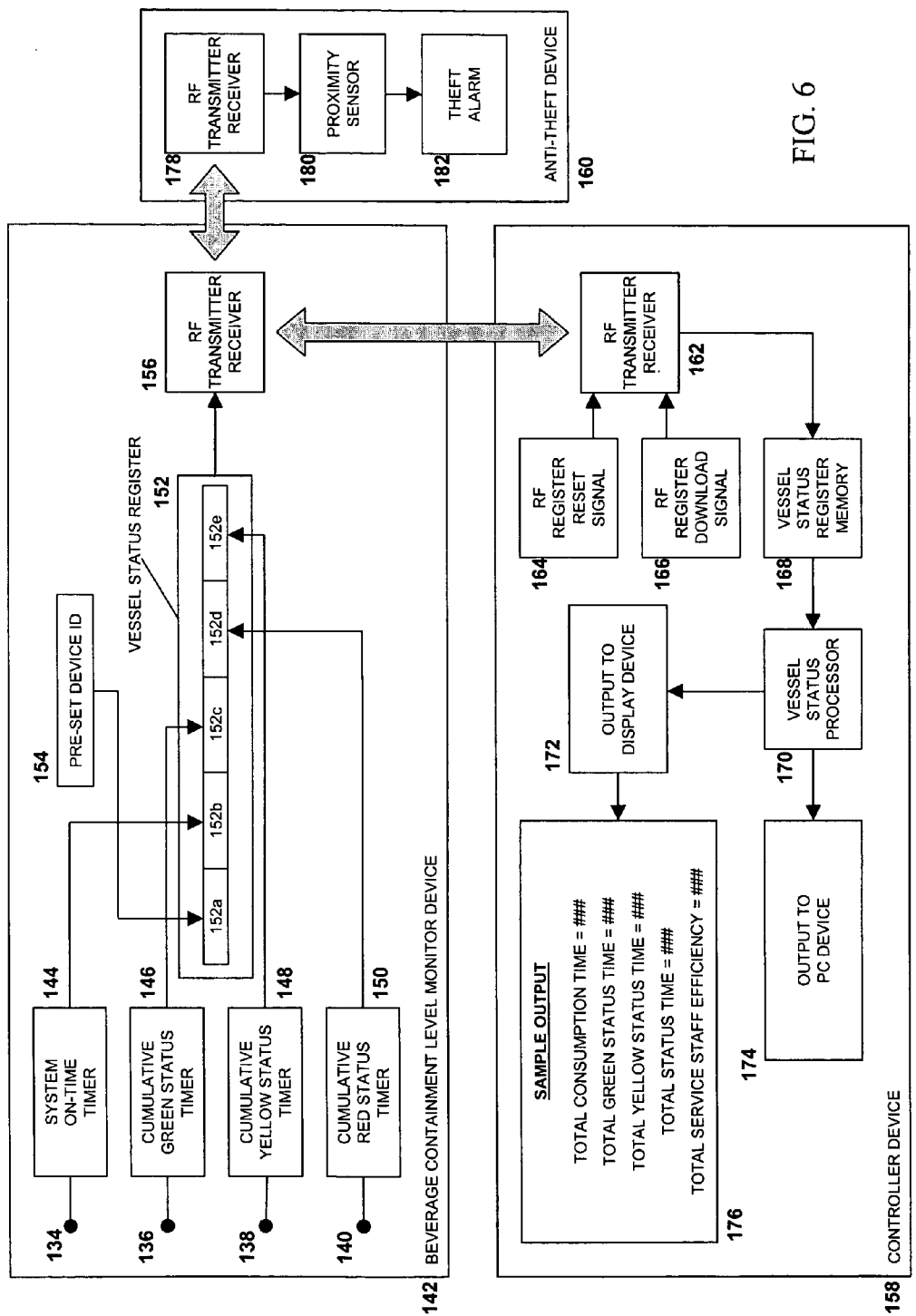
FIG. 6 shows the interface of one or more BCLM devices to a controller device and an anti-theft device.

FIG. 6 describes further functionality of the BCLM device, which allows it to interface to external devices for the purposes of external control, data transfer and proximity detection.

Internal to the BLCM device (142), signals (134, 136, 138, 140), correspond respectively to system on-time (in level monitor mode), green status, yellow status, and red status. Timer (144) output is the cumulative level mode system on-time, timer (146) output is the cumulative time the device has been in green status, timer (148) output is the cumulative time the device has been in yellow status, and timer (150) output is the cumulative time the device has been in red status.

Each cumulative timer output signal is input into the vessel status register (152), which stores the value of each of the four cumulative timers, as well as a pre-set device ID (154). A radio frequency (RF) transmitter and receiver (156), is integrated into the device, which can be activated by external RF signal from an external controller device (158) or an anti-theft notification device (160).

Referring to the controller device (158), one or more BCLM devices can be addressed through the RF transmitter and receiver (162). From this transmitter and receiver, the vessel status register in the BCLM device or devices may be reset to zero by means of signal (164). Also, the BCLM device or devices may be instructed to download the contents of the vessel status register to the controller (166), which will be stored in the controller vessel status register memory (168). Upon controller user command, the vessel status processor (170) may output data to either a display device (172) or a personal computing (PC) device (174). This processed data may contain the summation of one or more BCLM devices for the cumulative signals (144, 146, 148, 150), the BCLM pre-set device ID's (154), or computations derived from these signals, such as efficiency, comparative analysis, or other useful metrics.

Referring to the anti-theft notification device (160), an RF transmitter and receiver (178) is interfaced to a proximity sensor (180), which will determine the relative RF signal strength from a BCLM device transmitter (156). This relative signal strength will be proportional to the proximity of a BCLM device to the anti-theft notification device (160), which is prescribed to be in a place close to the main exit of a restaurant or other service establishment. If the proximity sensor (180) determines that a BCLM device is within approximately 3 feet of the anti-theft notification device, the theft alarm (182) will engage. The theft alarm may be a visual, auditory, or other signal to gain the attention of establishment employees or staff members.

Figure 7:
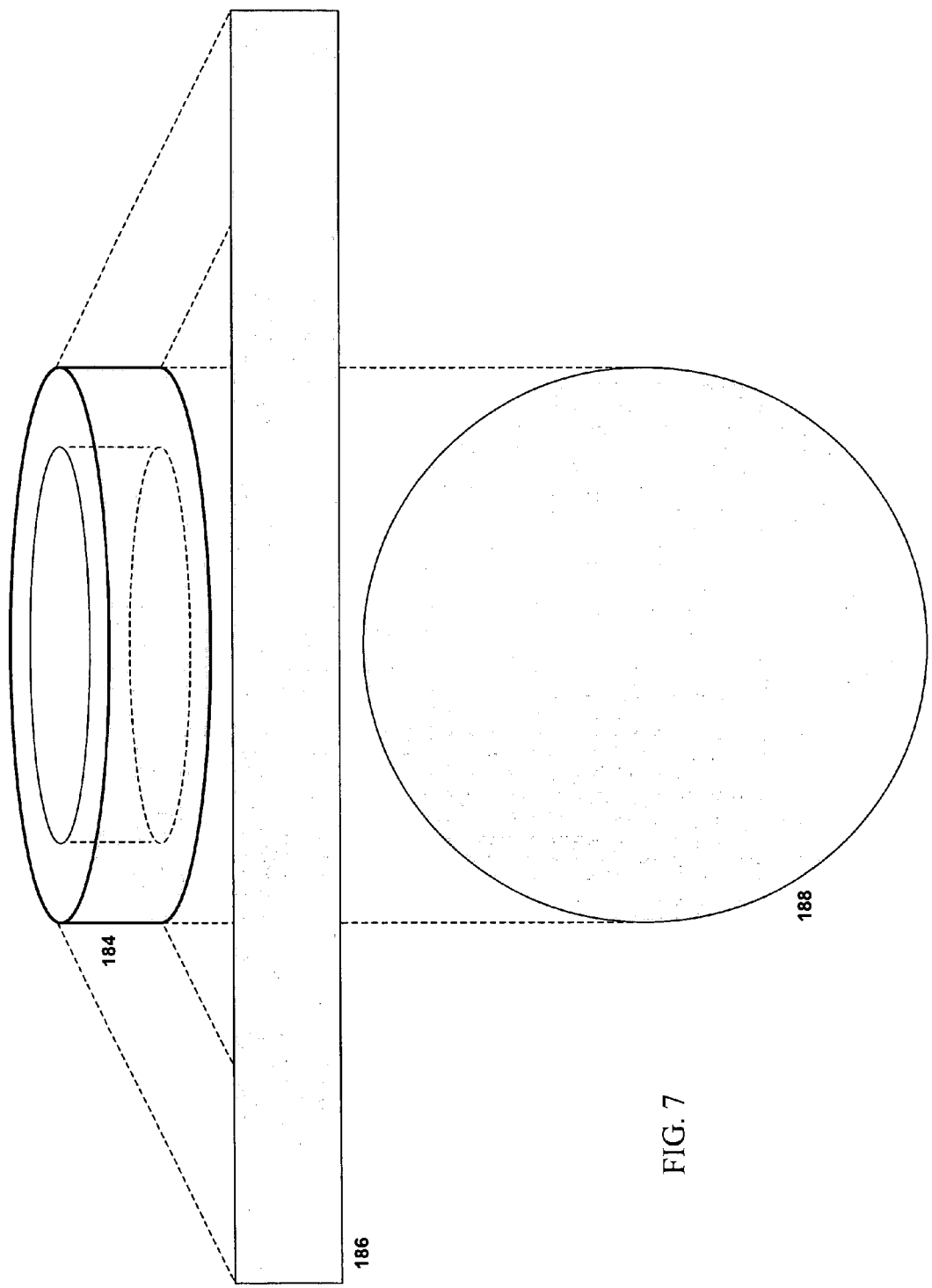
FIG. 7 shows the backlit illuminated advertising space available on the BCLM device

The advertising space available on the device is described by FIG. 7 that is available on the device (184) in the retrofitable embodiment. There is approximately 5¼ in$^2$, derived from a height of approximately ¾ inch and circumference length of approximately 7 inches, available on the outer circumference of the device in the preferred embodiment (186), and approximately 4 in$^2$, derived from a radius of approximately 1⅛ inches, available on the bottom of the device (188). This area is backlit when the device is in certain output states, and can provide for beverage advertising or other messages as desired by application of translucent stickers, tape, or by molding at the time of device manufacture.

The present invention having been thus described with particular reference to the preferred forms thereof, it will be obvious that various changes and modifications may be made therein without departing from the spirit and scope of the present invention as defined in the appended claims.

What is claimed is:

1. An apparatus for sensing the level of a liquid in a container for human beverage consumption, the apparatus comprising:
   a housing;
   a single non-immersed proportional angular displacement sensor being disposed in proximity to the beverage container to detect a level of the liquid while said beverage container is in use;
   and an alarm in communication with said sensor, wherein the alarm emits at least one signal when the sensor detects that the level of the liquid is equal or less than a predetermine level.

2. The apparatus of claim 1, wherein the sensor is disposed in proximity to a bottom portion of the container.

3. The apparatus of claim 1, wherein the alarm is at least one selected from the group consisting of:
   a light, a colored light, a colored light that is emitted through the liquid, audio, and any combinations thereof.

4. The apparatus of claim 1, further a data input device for end user programming of the apparatus, wherein the data input performs at least one function selected from the group consisting of:
   turning the apparatus on or off,
   setting the operational mode of the apparatus,
   and programming the apparatus.

5. The apparatus of claim 4, wherein the data input device is a magnetic switch.

6. The apparatus of claim 5, wherein the data input device is a switch or sensor that generates a pulse code for programming the apparatus.

7. The apparatus method of claim 1, wherein the alarm is at least one selected from the group consisting of:
   a visual alarm, an audible alarm, an electronic signal, a sensory perceptible alarm, a horn, a flashing light, a message, an electronic message, a tactile signal, a chirp, and any combinations thereof.

8. The apparatus method of claim 1, further comprising a step of programming the container for beverage consumption, wherein the programming step is at least one step selected from the group consisting of:
   turning the container on or off,
   setting the operational mode of the container,
   and programming the container.

9. The method of claim 8, wherein the programming is performed by a data input device which is a magnetic switch.

10. The method of claim 9, wherein the data input device is a magnetic switch that generates a pulse code for programming the apparatus.

11. The apparatus of claim 1, wherein the apparatus is disposed in a kit for connection to the container.

12. The apparatus of claim 1, wherein the apparatus is disposed within a coaster.

13. The apparatus of claim 1, wherein the apparatus is disposed within a handheld container.

14. An apparatus which indicates that a beverage refill is required, the apparatus comprising:
a container for human beverage consumption, having a single non-immersed proportional angular displacement sensor that detects an amount of the beverage in the beverage container while said container is in use,
and wherein the sensor is in communication with an alarm emits a signal in response to a level of the beverage which is equal to or less than a predetermined level.

* * * * *